United States Patent
Zhao et al.

(10) Patent No.: US 12,262,233 B2
(45) Date of Patent: Mar. 25, 2025

(54) INFORMATION REPORTING METHOD, TERMINAL AND BASE STATION

(71) Applicant: DATANG MOBILE COMMUNICATIONS EQUIPMENT CO., LTD., Beijing (CN)

(72) Inventors: Zheng Zhao, Beijing (CN); Jiaqing Wang, Beijing (CN); Meiying Yang, Beijing (CN); Chen Luo, Beijing (CN); Shaohui Sun, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 339 days.

(21) Appl. No.: 17/775,270

(22) PCT Filed: Oct. 28, 2020

(86) PCT No.: PCT/CN2020/124357
§ 371 (c)(1),
(2) Date: May 7, 2022

(87) PCT Pub. No.: WO2021/088696
PCT Pub. Date: May 14, 2021

(65) Prior Publication Data
US 2022/0394522 A1    Dec. 8, 2022

(30) Foreign Application Priority Data
Nov. 8, 2019  (CN) .......................... 201911089904.5

(51) Int. Cl.
*H04W 24/08*    (2009.01)
*H04W 52/02*    (2009.01)
*H04W 76/28*    (2018.01)

(52) U.S. Cl.
CPC ....... *H04W 24/08* (2013.01); *H04W 52/0235* (2013.01); *H04W 76/28* (2018.02)

(58) Field of Classification Search
CPC .............................. H04B 7/0626; H04B 7/063
See application file for complete search history.

(56) References Cited

U.S. PATENT DOCUMENTS

2019/0081679 A1    3/2019  Davydov et al.
2021/0037484 A1*   2/2021  Zhou ...................... H04L 1/1854
(Continued)

FOREIGN PATENT DOCUMENTS

CN      109905224 A      6/2019
CN      110300444 A     10/2019
(Continued)

OTHER PUBLICATIONS

CMCC,"Discussion on PDCCH-based power saving signal/channel design", 3GPP TSG RAN WG1 #97, Reno, USA, May 13-7, 2019, total 10 pages, R1-1906524.

(Continued)

*Primary Examiner* — Chi Ho A Lee
(74) *Attorney, Agent, or Firm* — Kilpatrick Townsend & Stockton LLP

(57) ABSTRACT

Provided in the embodiments of the present disclosure are an information reporting method, a terminal and a base station. The method includes receiving first indication information that is configured for a terminal by a base station and is used for reporting channel state information (CSI) in an energy-saving state; receiving first downlink control information (DCI) that is sent by the base station and is scrambled by a power saving radio network temporary identity (PS-RNTI); and performing CSI measurement according to the first indication information and/or the first DCI, and reporting a CSI measurement result to the base station. Therefore, by (Continued)

means of the present disclosure, a base station can obtain a CSI measurement result in a timely manner and perform effective scheduling, and a terminal executes CSI reporting in an energy-saving state under the instruction of the base station, to improve the efficiency of CSI reporting.

16 Claims, 3 Drawing Sheets

(56) References Cited

U.S. PATENT DOCUMENTS

| | | | |
|---|---|---|---|
| 2021/0377852 A1* | 12/2021 | Zhou | H04W 76/28 |
| 2022/0174601 A1* | 6/2022 | Chen | H04W 72/1263 |
| 2022/0240284 A1* | 7/2022 | Zhou | H04L 5/0096 |
| 2022/0248329 A1* | 8/2022 | Peng | H04W 52/0235 |
| 2022/0264461 A1* | 8/2022 | Chen | H04W 72/0446 |
| 2023/0131118 A1* | 4/2023 | Kim | H04W 52/0216 |
| | | | 370/311 |

FOREIGN PATENT DOCUMENTS

| | | |
|---|---|---|
| CN | 110536387 A | 12/2019 |
| KR | 20190071655 A | 6/2019 |
| WO | 2019160353 A1 | 8/2019 |

OTHER PUBLICATIONS

Intel Corporation, "Considerations on PDCCH-based power saving signal", 3GPP TSG-RAN WG1 #98-bis, Chongqing, China, Oct. 14-20, 2019, total 10 pages, R1-1910671.

CMCC, "Discussion on PDCCH-based power saving signal/channel design", 3GPP TSG RAN WG1 #98, Prague, CZ, Aug. 26-30, 2019, total 6 pages, R1-1908871.

European Patent Office, Extended European Search Report Issued in Application No. 20885862.1, Oct. 31, 2023, Germany, 14 pages.

* cited by examiner

INFORMATION REPORTING METHOD, TERMINAL AND BASE STATION

CROSS-REFERENCE TO RELATED APPLICATIONS

The present application is a National Stage of International Application No. PCT/CN2020/124357, filed on Oct. 28, 2020, which claims priority to Chinese patent application No. 201911089904.5, filed on Nov. 8, 2019, entitled "Method for Reporting CSI, Terminal and Base Station", which are incorporated herein by reference in their entireties.

FIELD

The present application relates to communication technology, and more particularly, to a method for reporting information, a terminal and a base station.

BACKGROUND

Discontinuous Reception (DRX) means that a terminal will stop monitoring a Physical Downlink Control Channel (PDCCH) channel for some time.

In New Radio (NR) system, a base station will indicate whether a user starts onDuration timer in a subsequent DRX. If the onDuration timer is started, the terminal will report periodic and semi-persistent Channel State Information (CSI). Otherwise, the terminal will not report the periodic and semi-persistent CSI. When the base station expects that the user sleeps for a long time, the base station will indicate that the user does not start onDuration timer for a continuous period, then the base station will not get the information of the user's periodic and semi-persistent CSI for a long time, nor the state information of a basic link. At present, there is no more detailed discussion on CSI reporting.

SUMMARY

The present application provides a method for reporting information, a terminal and a base station in order to realize reporting channel state information (CSI) in power saving state.

According to one embodiment of the present application, provided is a method for reporting information, including:
  receiving first indication information configured for a terminal by a base station for reporting channel state information (CSI) in a power saving state;
  receiving first downlink control information (DCI) scrambled by power saving radio network temporary identity (PS-RNTI), transmitted by the base station; and
  performing a CSI measurement according to the first indication information and/or the first DCI and reporting a CSI measurement result to the base station.

According to one embodiment of the present application, provided is a method for reporting information, including:
  transmitting first indication information configured for a terminal for reporting channel state information (CSI) in a power saving state;
  generating first downlink control information (DCI) scrambled by power saving radio network temporary identity (PS-RNTI) and transmitting the first DCI to the terminal and the terminal performs CSI measurement according to the first indication information and/or the first DCI; and
  receiving a CSI measurement result reported by the terminal and performing a corresponding scheduling according to the CSI measurement result.

According to one embodiment of the present application, provided is a device for reporting information, including:
  a first receiving device, configured for receiving first indication information configured for a terminal by a base station for reporting channel state information (CSI) in a power saving state;
  a second receiving device, configured for receiving first downlink control information (DCI) scrambled by power saving radio network temporary identity (PS-RNTI), transmitted by the base station; and
  a reporting device, configured for performing a CSI measurement according to the first indication information and/or the first DCI and reporting a CSI measurement result to the base station.

According to one embodiment of the present application, provided is a device for reporting information, including:
  a first transmitting device, configured to transmit a first indication information configured for a terminal for reporting channel state information (CSI) in a power saving state;
  a second transmitting device, configured to generate a first downlink control information (DCI) scrambled by power saving radio network temporary identity (PS-RNTI), and transmit the first DCI to the terminal and the terminal performs CSI measurement according to the first indication information and/or the first DCI; and
  a receiving device, configured to receive a CSI measurement result reported by the terminal and perform a corresponding scheduling according to the CSI measurement result.

According to one embodiment of the present application, provided is a terminal, including a memory, a processor and a program stored in the memory and executable by the processor, and the processor performs following steps in case of executing the program:
  receiving first indication information configured for a terminal by a base station for reporting channel state information (CSI) in a power saving state;
  receiving first downlink control information (DCI) scrambled by power saving radio network temporary identity (PS-RNTI); and
  performing a CSI measurement according to the first indication information and/or the first DCI and reporting a CSI measurement result to the base station.

According to one embodiment of the present application, provided is a base station, including a memory, a processor and programs stored in the memory and executable by the processor. The programs, when executed by a processor, cause the processor to implement the following steps in case of executing the program:
  transmitting first indication information configured for a terminal for reporting channel state information (CSI) in a power saving state;
  generating first downlink control information (DCI) scrambled by power saving radio network temporary identity (PS-RNTI) and transmitting the first DCI to the terminal and the terminal performs CSI measurement according to the first indication information and/or the first DCI; and
  receiving a CSI measurement result reported by the terminal and performing a corresponding scheduling according to the CSI measurement result.

According to one embodiment of the present application, provided is a non-transient computer readable storage medium storing computer program, the computer programs, when executed by a processor, cause the processor to implement steps of the method for reporting information according to the embodiments.

According to one embodiment of the present application, provided is a non-transient computer readable storage medium storing a computer program, the computer programs, when executed by a processor, cause the processor to implement steps of the method for reporting information according to the embodiments.

The method for reporting information, terminal and base station provided by the embodiments of the present application, by receiving the first indication information configured for the terminal by the base station for reporting the CSI in the power saving state, receiving the first DCI scrambled by PS-RNTI transmitted by the base station, performing the CSI measurement according to the first indication information and the first DCI and reporting the CSI measurement result to the base station, the base station can obtain the CSI measurement result in time and schedule effectively, to realize the terminal reporting the CSI in the power saving state under the indication of the base station and improve the efficiency of reporting CSI.

BRIEF DESCRIPTION OF THE DRAWINGS

The embodiments of the present application or prior art can be more clearly illustrate, the appended drawings used in the embodiments or the description of prior art are briefly introduced below. It should be noted that, the appended drawings in the following description are only some embodiments of the present application.

DETAILED DESCRIPTION

In order to make the purposes of the embodiments of the present application clearer, the embodiments of the present application is clearly and completely described in combination with the appended drawings of the embodiments of the present application. The embodiments described are a part of the embodiments of the present application, rather than all the embodiments. Based on the embodiments of the present application, all other embodiments obtained fall within the scope of the protection of the present application.

In a NR system, a base station will indicate whether a user starts onDuration timer in a subsequent Discontinuous Reception (DRX). If the onDuration timer is started, a terminal will report periodic and semi-persistent Channel State Information (CSI). Otherwise, the terminal will not report the periodic and semi-persistent CSI. When the base station expects that the user sleeps for a long time, the base station will indicate that the user does not start onDuration timer for a continuous period, then the base station will not get the information of the user's periodic and semi-persistent CSI for a long time, nor the state information of a basic link.

In a power saving system, if the base station expects that the user detects PDCCH in the subsequent DRX period, the base station will instruct the user to wake up. After the user wakes up, PDCCH monitoring and other operations are needed.

The base station may require the user to report the information of a corresponding periodic CSI in a aperiodic manner, but in the power saving state, the aperiodic configuration state is less. If the aperiodic state needs to include the periodic state information, the number of the aperiodic states available to the base station will be limited.

From the configuration point of view, the periodic CSI provides the base station with broadband and long-term average channel data. The base station may indicate the user to feedback aperiodic CSI with finer state according to the periodic CSI state. Without the information of the periodic CSI, the base station cannot indicate the information of the aperiodic CSI.

Aiming at above problems, the present application combines the timing characteristics and contents of Downlink Control Information (DCI) scrambled by power saving radio network temporary identity (PS-RNTI) in the power saving system, and provides pilot resources of periodic, semi-continuous and aperiodic CSI in the power saving system and the CSI reporting methods and devices. It may make the base station get the CSI reporting information earlier and more accurately and schedule the CSI reporting information more effectively. The DCI scrambled by PS-RNTI is indicated by DCI format 3. In the following, the PDCCH carrying DCI scrambled by the PS-RNTI is referred to as PS PDCCH.

Now the present application is illustrated by the following embodiments.

Figure 1:
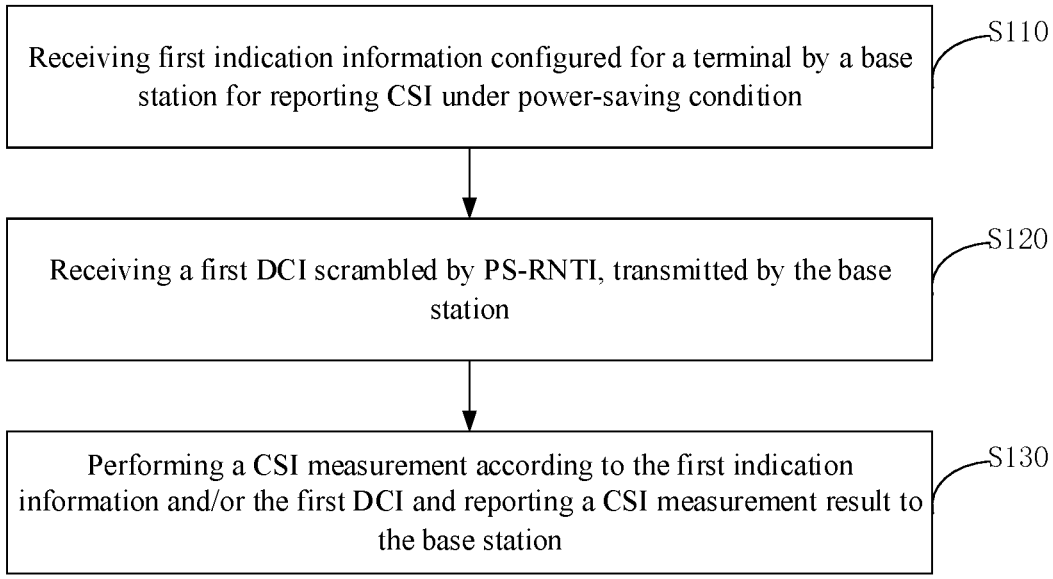
FIG. 1 is a flow diagram of a method for reporting information according to an embodiment of the present application.

Refer to FIG. 1, FIG. 1 is a flow diagram of a method for reporting information in accordance with embodiments of the present application, and the method may be used for a terminal, including the following steps:

S110: receiving first indication information configured for a terminal by a base station for reporting CSI in a power saving state.

In one embodiment, the base station may configure for the terminal the first indication information of periodic CSI, semi-persistent CSI, aperiodic CSI and/or CSI-reference signal (RS)-based resource mobility measurement in the power saving state. The first indication information may include, but not limited to the following contents: state information or resource information of the aperiodic CSI in the system, CSI measurement or reporting period, and the CSI types needed to be reported.

S120: receiving a first DCI scrambled by PS-RNTI, transmitted by the base station.

In one embodiment, in order to report the CSI information as soon as possible, the base station may indicate UE to report the CSI through DCI scrambled by PS-RNTI, and the base station may obtain the CSI measurement result reported by the terminal as soon as possible, and may accurately schedule data rather than use outdated CSI scheduling data.

S130: performing a CSI measurement according to the first indication information and/or the first DCI and reporting a CSI measurement result to the base station.

In one embodiment, in the measurements based on CSI-RS-resource-mobility, only the first indication information is needed. In one embodiment, the CSI measurement and/or report depend only on the first indication information, which maintains an original level of the CSI measurement.

It can be seen from the above embodiments that by receiving the first indication information configured for the terminal by the base station for reporting CSI in the power saving state, receiving the first DCI scrambled by PS-RNTI transmitted by the base station, and performing the CSI measurement according to the first indication information and the first DCI and reporting the CSI measurement result to the base station, the base station can obtain the CSI measurement result in time, perform an effective scheduling, realize reporting the CSI in the power saving state by the terminal under the indication of the base station, and improve the efficiency of reporting CSI.

Further, based on the method above, the types of the CSI includes at least one type of the periodic CSI, the semi-persistent CSI, the aperiodic CSI or the CSI-Reference Signal (RS)-based resource mobility measurement.

Further, based on the method above, when performing S130, it may includes (1-1) measuring and/or reporting the CSI according to third indication information for reporting the CSI which is standard-predefined and/or high-layer preconfigured; and/or (1-2) measuring and/or reporting the CSI according to second indication information included in the first DCI.

Further, based on the method above, the second indication information in (1-2) is used for indicating whether a user reports the CSI in a subsequent discontinuous reception (DRX) period; and the second indication information is further used for indicating a status of the aperiodic CSI, reporting-source information, reporting-identification numbers of the periodic CSI, reporting-identification numbers of the semi-persistent CSI, information of a secondary cell (Scell) or a Scell group reported by the CSI;

the reporting-identification numbers of the periodic CSI includes one or more identification numbers of all the periodic CSI or semi-persistent CSI or all identification numbers of the periodic CSI or the semi-persistent CSI.

Further, based on the method above, the second indication information in (1-2) at least includes a joint code including at least two of CSI reporting indication including CSI status indication to be reported;

resource indication; and waking up or sleeping indication.

In one embodiment, the requirements for reporting CSI when sleeping and waking up is different, the periodic CSI should be reported when sleeping and the aperiodic CSI should be reported when waking up. Therefore, sleeping or waking indications may be coded jointly with the indications reported by CSI. DCI scrambled by PS-RNTI indicates whether the user reports the periodic or the semi-persistent CSI during sleeping, and indicates that the user reports aperiodic CSI when waking up. As shown in Table 1, Table 2 and Table 3 below, the contents corresponding to each code word indicated by the joint indication may indicate sleeping or waking up, and also indicate the information of the CSI. The contents corresponding to each code word may be high-layer configured and/or standard-predefined.

TABLE 1

| Bit information | Indication content |
| --- | --- |
| 000 | sleep, report periodic CSI/semi-persistent CSI |
| 001 | sleep, not report CSI |
| 010 | wake up, report status 1 of aperiodic CSI |
| 011 | wake up, report status 2 of aperiodic CSI |
| 100 | wake up, report status 3 of aperiodic CSI |
| 101 | wake up, report status 4 of aperiodic CSI |
| 110 | wake up, report status 5 of aperiodic CSI |
| 111 | wake up, report status 6 of aperiodic CSI |

Table 1 includes the contents indicated by different bit values when there are 3 bits in DCI.

TABLE 2

| Bit information | Indication content |
| --- | --- |
| 00 | sleep, report periodic CSI/semi-persistent CSI |
| 01 | sleep, not report CSI |
| 10 | wake up, not report CSI |
| 11 | wake up, report status 1 of aperiodic CSI |

Table 2 includes the contents indicated by different bit values when there are 2 bits in DCI.

TABLE 3

| Bit information | Indication content |
| --- | --- |
| 00 | sleep, report periodic CSI/semi-persistent CSI |
| 01 | sleep, not report CSI |
| 10 | wake up, report status 1 of aperiodic CSI |
| 11 | wake up, report status 2 of aperiodic CSI |

Table 3 includes the contents indicated by different bit values when there are 2 bits in DCI.

Further, based on the method above, processes are as follows when the first DCI scrambled by PS-PNTI is missed to be detected:

if the RRC configures that the user sleeps, not wakes up in other word, when the user fails to detect a DCI scrambled by PS-RNTI. Then the user does not report the CSI when the DCI is missed to be detected.

Further, based on the above (1-1) or (1-2), performing the CSI measurement according to the first indication information and/or the first DCI and reporting the CSI measurement result to the base station includes:

performing the CSI measurement and reporting the CSI measurement result to the base station when the first DCI indicates that the user wakes up, which makes the user to perform the CSI measurement and/or report in advance after waking up, and the base station may schedule the data effectively according to the channel quality.

Further, based on the method above, the third indication information in (1-1) includes:

(2-1) a standard-predefined and/or high-layer preconfigured CSI measurement period and/or a CSI reporting period;

(2-2) a determination of whether to report the CSI;

(2-3) reporting-source information; and (2-4) the reporting-identification numbers of the periodic CSI or the reporting-identification numbers of the semi-persistent CSI, information of secondary cell (Scell) or Scell group reported by the CSI.

The reporting-identification numbers of the periodic CSI includes one or more of all identification numbers of all the periodic CSI or the semi-persistent CSI or all identification numbers of the periodic CSI or the semi-persistent CSI.

Further, based on the method above, the standard-predefined and/or high-layer preconfigured CSI measurement period and/or CSI reporting period in (2-1) satisfies the following condition:
  a specified period prior to a configured DRX timer (onDuration timer) starts, during which the CSI is measured and reported.

Further, based on the method above, the standard-predefined and/or high-layer preconfigured CSI measurement period and/or CSI reporting period in (2-1) satisfies the following condition:
  a period subsequent to a first power saving physical downlink control channel (PS PDCCH) detecting occasion.

Further, based on the method above, the standard-predefined and/or high-layer preconfigured CSI measurement period and/or CSI reporting period in (2-1) satisfies the following condition:
  the most recent CSI measurement occasion occurs in a period for CSI to be reported; and/or the terminal reports the CSI only in case of receiving at least one CSI-RS transmission occasion for channel measurement and CSI-RS and/or CSI-IM transmission occasion for interference measurement in a period for CSI to be reported.

Further, based on the method above, the standard-predefined and/or high-layer preconfigured CSI measurement period and/or CSI reporting period in (2-1) satisfies the following condition:
  when the terminal is configured with the DRX, the terminal is not required to perform measurement of CSI-RS resources other than during a second measurement time for measurements based on CSI-RS-resource-mobility.

Further, based on the method above, the second measurement time is time indicated by the onDuration timer configured by a system and active time.

Further, based on the method above, when performing step 130, reporting the CSI measurement result to the base station includes:
  reporting the CSI measurement result to the base station according to a second DCI if the second DCI used for scheduling CSI reporting resources is received.

In one embodiment, the base station sends the second DCI in order to inform the terminal of the reporting resources used when reporting the CSI. In addition, the base station sends the second DCI subsequent to the first DCI, which includes transmitting at an active time. For example, the transmission is started at the active time.

In addition, the present application may define an interval in DRX inactive time, and the interval may be used for calculating the CSI without performing PDCCH detecting. The DCI scrambled by the PS-RNTI starts earlier than the DRX timer (onDuration timer). According to the traditional standards, the terminal may only complete the CSI measurement after the DRX timer (onDuration timer) starts. However, in the present application, the CSI measurement can be completed before the DRX timer (onDuration timer) starts, and the base station may obtain the CSI information in time and schedule the resources effectively.

Further, the information obtained by the physical layer from MAC is an indication indicating whether each period is the active time, and whether the PS PDCCH detecting is performed in the inactive time. If the active time is modified in advance, UE may be allowed to report the CSI in advance.

However, high layer configuration will also make UE perform PDCCH detecting, which increases the power consumption. According to the present application, a starting point and an ending point of a period can be determined in the physical layer, and at least one measured CSI-RS and/or CSI-IM is at the active time and the period. Also, in the present application, prior to the DRX onDuration timer configuration time starting point means that the starting point of the period is before the DRX onDuration timer configuration time starting point.

The base station may configure a window for the user to perform PS PDCCH detecting before the DRX period. With multiple PS PDCCH detecting opportunities in the window, the physical layer is informed of first PS PDCCH detecting occasion.

The starting point of the period may include:
  Scheme 1 for the starting point: the first PS PDCCH detecting occasion, the PDCCH carrying the DCI scrambled by PS-RNTI, which is referred as PS PDCCH;
  Scheme 2 for the starting point: offsetting a period subsequent to the first PS PDCCH detecting occasion, this offset may be high-layer configured or standard-predefined as one or several fixed values;
  Scheme 3 for the starting point: making a starting point of the PS PDCCH detection window as the starting point;
  Scheme 4 for the starting point: offsetting a period subsequent to the starting point of the PS PDCCH detection window, and this offset may be high-layer configured or standard-predefined as one or several fixed values; and
  Scheme 5 for the starting point: a high layer indicates the starting point, which is an absolute-value time point.

In addition, the ending point of the period may include:
  Scheme 1 for the ending point: adding an offset at the starting point, and the offset value is high-layer configured or standard-predefined;
  Scheme 2 for the ending point: the high layer defines the ending point;
  Scheme 3 for the ending point: a starting point of active time; and
  Scheme 4 for the ending point: offsetting a period before the active time, and the offset value is high-layer configured or standard-predefined.

Therefore, in addition to completing the CSI measurement or performing the mobility measurement at the active time or at a part of the active time according to the traditional standards, the CSI measurement may also be completed within the period specified in the present application.

Figure 2:
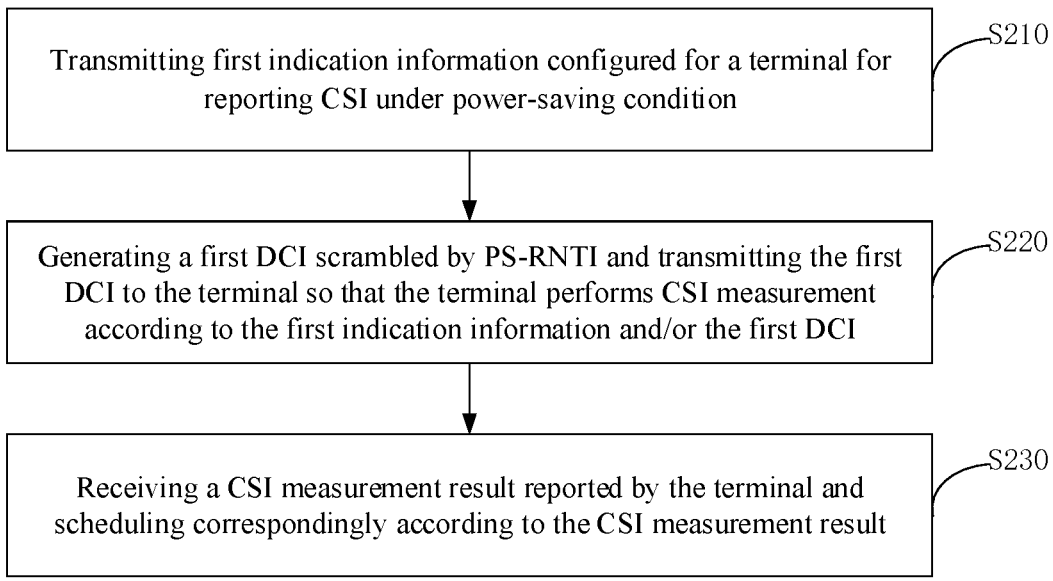
FIG. 2 is a flow diagram of a method for reporting information according to an embodiment of the present application.

Refer to FIG. 2, FIG. 2 is a flow diagram of a method for reporting information according to an embodiment of the present application, and the method may be used for a base station, including the following steps:

S210: transmitting first indication information configured for a terminal for reporting channel state information (CSI) in a power saving state;

S220: generating a first DCI scrambled by PS-RNTI and transmitting the first DCI to the terminal and the terminal performs CSI measurement according to the first indication information and/or the first DCI; and S230: receiving a CSI measurement result reported by the terminal and performing a corresponding scheduling according to the CSI measurement result.

It can be seen from the above embodiments that by transmitting the first indication information configured for the terminal by the base station for reporting the CSI in a power saving state, generating the first DCI scrambled by the PS-RNTI, transmitting the first DCI to the terminal, receiving the CSI measurement result reported by the terminal, and performing a corresponding scheduling according to the CSI measurement result, the base station can obtain the CSI measurement result in time, perform an effective scheduling, realize reporting the CSI in a power saving state by the terminal under the indication of the base station, and improves the efficiency of reporting CSI.

Further, based on the method above, types of the CSI include at least one type of periodic CSI, semi-persistent CSI, aperiodic CSI or measurements based on CSI-RS-resource-mobility.

Further, based on the method above, the CSI measurement result is determined by the terminal:

(3-1) by performing CSI measuring and/or reporting according to a standard-predefined and/or high-layer preconfigured third indication information used for reporting CSI; and/or (3-2) by performing CSI measuring and reporting according to a second indication information included in the first DCI.

Further, based on the method above, the second indication information in (3-2) is used for indicating whether a user reports the CSI in a subsequent discontinuous reception (DRX) period; and the second indication information in (3-2) is also used for indicating a status of the aperiodic CSI, reporting-source information, reporting-identification numbers of the periodic CSI, reporting-identification numbers of semi-persistent CSI, information of a secondary cell (Scell) or a Scell group reported by CSI;

the reporting-identification numbers of the periodic CSI includes one or more identification numbers of all the periodic CSI or the semi-persistent CSI or all identification numbers of the periodic CSI or the semi-persistent CSI.

Further, based on the method above, the second indication information in (3-2) at least includes a joint code including at least two of CSI reporting indication;
resource indication; and
waking up or sleeping indication.

In one embodiment, the specific joint codes are showed in table 1, table 2 and table 3 above.

Further, based on the method above, the CSI measuring and/or reporting is performed by the terminal when the first DCI indicates that a user wakes up.

Further, based on the method above, the third indication information in (3-1) may include:

(4-1) a standard-predefined and/or high-layer preconfigured CSI measurement period and/or a CSI reporting period;
(4-2) a determination of whether to report the CSI;
(4-3) reporting-resource information; and
(4-4) the reporting-identification numbers of the periodic CSI or the reporting-identification numbers of the semi-persistent CSI, the information of a secondary cell (Scell) or a Scell group reported by the CSI; in which:
the reporting-identification numbers of the periodic CSI includes one or more identification numbers of all the periodic CSI or the semi-persistent CSI or all identification numbers of the periodic CSI or the semi-persistent CSI.

Further, based on the method above, the standard-predefined and/or high-layer preconfigured CSI measurement period and/or reporting period in (4-1) satisfies the following condition:

a specified period prior to a configured DRX timer (onDuration timer) starts, during which the CSI is measured and reported.

Further, based on the method above, the standard-predefined and/or high-layer preconfigured CSI measurement period and/or reporting period in (4-1) satisfies the following condition:

a period subsequent to a first power saving physical downlink control channel (PS PDCCH) detecting occasion.

Further, based on the method above, the standard-predefined and/or high-layer preconfigured CSI measurement period and/or reporting period in (4-1) satisfies the following condition:

the most recent CSI measurement occasion occurs in a period for CSI to be reported; and/or the terminal reports the CSI only in case of receiving at least one CSI-RS transmission occasion for channel measurement and CSI-RS and/or CSI-IM transmission occasion for interference measurement in a period for CSI to be reported.

Further, based on the method above, the standard-predefined and/or high-layer preconfigured CSI measurement period and/or reporting period in (4-1) satisfies the following condition:

when the terminal is configured with the DRX, the terminal is not required to perform measurement of CSI-RS resources other than during a second measurement time for measurements based on CSI-RS-resource-mobility.

Further, based on the method above, the second measurement time is time indicated by the onDuration timer configured by a system and active time.

Further, based on the method above, after S120, further including:

generating a second DCI for scheduling CSI reporting resources, and transmitting the second DCI to the terminal and the terminal reports the CSI measurement result to the base station according to the second DCI.

In one embodiment, the base station sends the second DCI in order to inform the terminal of the reporting resources used when reporting the CSI. In addition, the base station sends the second DCI subsequent to the first DCI, which includes transmitting at an active time.

Figure 3:
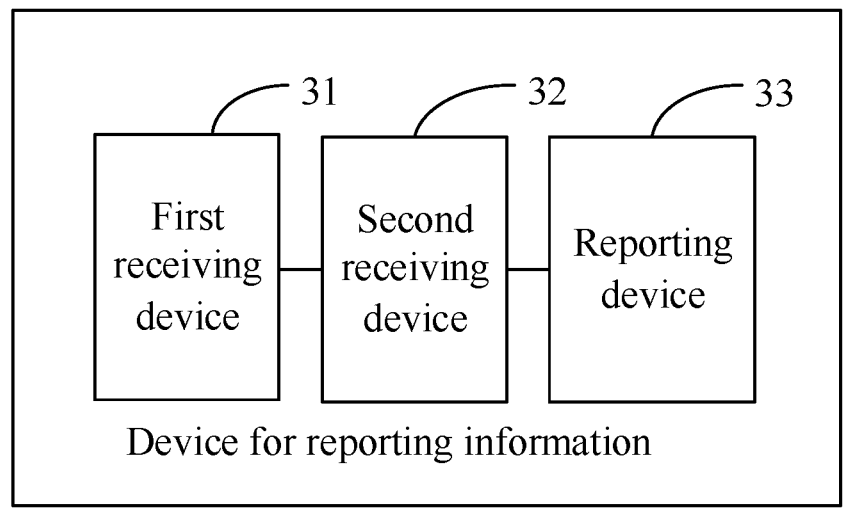
FIG. 3 is a modular diagram of a device for reporting information according to an embodiment of the present application.

Refer to FIG. 3, FIG. 3 is a modular diagram of a device for reporting information according to an embodiment of the present application, and the device may be used for a terminal, including:

a first receiving device 31, configured to receive first indication information configured for a terminal by a base station for reporting channel state information (CSI) in a power saving state;

a second receiving device 32, configured to receive a first downlink control information (DCI) scrambled by power saving radio network temporary identity (PS-RNTI), transmitted by the base station; and a reporting device 33, configured to perform a CSI measurement according to the first indication information and/or the first DCI and report a CSI measurement result to the base station.

Figure 4:
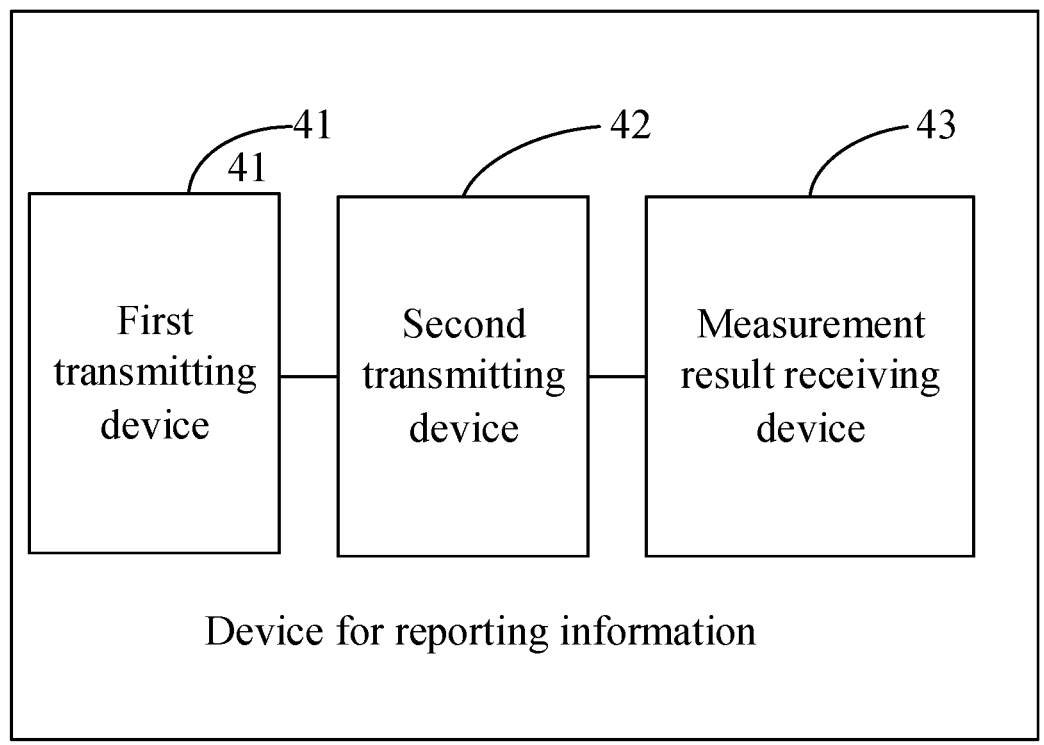
FIG. 4 is a modular diagram of a device for reporting information according to an embodiment of the present application.

Refer to FIG. 4, FIG. 4 is a modular diagram of a device for reporting information according to an embodiment of the present application, and the device may be used for a base station, including:

a first transmitting device 41, configured to transmit first indication information configured for a terminal for reporting channel state information (CSI) in a power saving state;

a second transmitting device 42, configured to generate a first downlink control information (DCI) scrambled by power saving radio network temporary identity (PS-RNTI), and transmit the first DCI to the terminal and the terminal performs CSI measurement according to the first indication information and/or the first DCI; and a measurement result receiving device 43, configured to receive a CSI measurement result reported by the terminal and perform a corresponding scheduling according to the CSI measurement result.

It should be noted that the device provided by this embodiment can achieve all the methodological steps that the method embodiments can achieve, and achieve the same beneficial effects. Thus, the same contents and beneficial effects of the device embodiments as those of the method embodiments are not repeated here.

Figure 5:
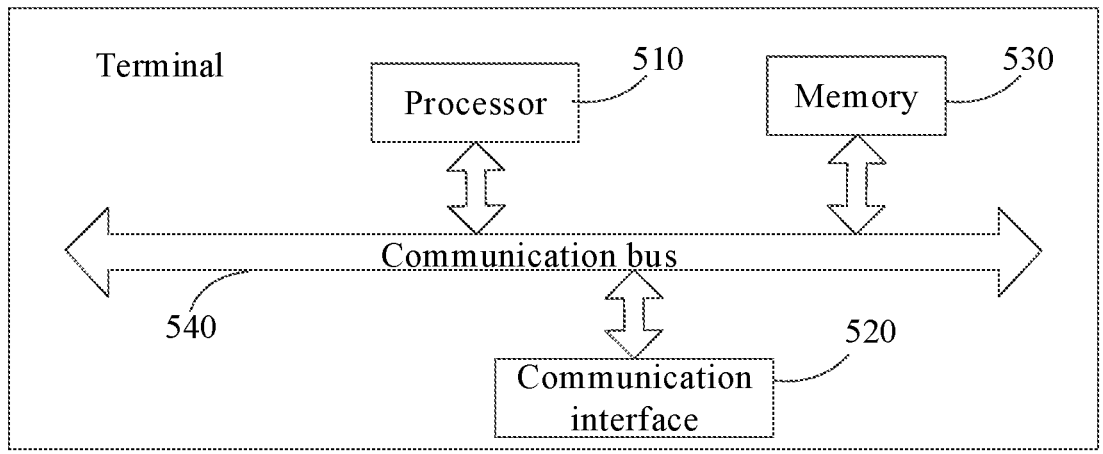
FIG. 5 is a structural diagram of a terminal according to an embodiment of the present application.

Furthermore, refer to FIG. 5, which is an entity structural diagram of a terminal according to an embodiment of the present application, and the terminal may include a processor 510, a communication interface 520, a memory 530 and a communication bus 540. The processor 510, the communication interface 520 and the memory 530 communicate with each other through the communication bus 540. The processor 510 may call computer program stored in the memory 530 and running on processor 510 to perform the following steps:

receiving first indication information configured for the terminal by the base station for reporting channel state information (CSI) in a power saving state;

receiving first downlink control information (DCI) scrambled by power saving radio network temporary identity (PS-RNTI), transmitted by the base station; and performing a CSI measurement according to the first indication information and/or the first DCI and reporting a CSI measurement result to the base station.

In one embodiment, types of the CSI include at least one type of periodic CSI, semi-persistent CSI, aperiodic CSI or measurements based on CSI-RS-resource-mobility.

In one embodiment, the performing the CSI measurement according to the first indication information and/or the first DCI and reporting the CSI measurement result to the base station includes:

measuring and/or reporting the CSI according to third indication information for reporting the CSI which is standard-predefined and/or high-layer preconfigured; and/or measuring and/or reporting the CSI according to a second indication information included in the first DCI.

In one embodiment, the second indication information is used for indicating whether a user reports the CSI in a subsequent discontinuous reception (DRX) period; and the second indication information is also used for indicating a status of the aperiodic CSI, reporting-source information, reporting-identification numbers of the periodic CSI, reporting-identification numbers of the semi-persistent CSI, information of a secondary cell (Scell) or a Scell group reported by the CSI; and the reporting-identification numbers of the periodic CSI includes one or more identification numbers of all the periodic CSI or the semi-persistent CSI or all identification numbers of the periodic CSI or the semi-persistent CSI.

In one embodiment, the second indication information at least includes a joint code including at least two of:

CSI reporting indication including CSI status indication to be reported;

resource indication; and waking up or sleeping indication.

In one embodiment, performing the CSI measurement according to the first indication information and/or the first DCI and reporting the CSI measurement result to the base station includes:

performing the CSI measurement and reporting the CSI measurement result to the base station when the first DCI indicates that the user wakes up.

In one embodiment, the third indication information includes:

a standard-predefined and/or high-layer preconfigured CSI measurement period and/or a CSI reporting period;

a determination of whether to report CSI; and reporting-identification numbers of periodic CSI or reporting-identification numbers of semi-persistent CSI, information of secondary cell (Scell) or Scell group reported by the CSI;

The reporting-identification numbers of the periodic CSI includes one or more identification numbers of all the periodic CSI or the semi-persistent CSI or all identification numbers of the periodic CSI or the semi-persistent CSI.

In one embodiment, the standard-predefined and/or high-layer preconfigured CSI measurement period and/or the reporting period includes at least one of:

a specified period prior to a configured DRX timer (onDuration timer) starts, during which the CSI is measured and reported;

a period subsequent to a first PS PDCCH detecting occasion;

the most recent CSI measurement occasion occurs in a period for the CSI to be reported; and/or, the terminal reports the CSI only in case of receiving at least one CSI-RS transmission occasion for channel measurement and CSI-RS and/or CSI-IM transmission occasion for interference measurement in a period for CSI to be reported; and when the terminal is configured with the DRX, the terminal is not required to perform measurement of CSI-RS resources other than during a second measurement time for measurements based on CSI-RS-resource-mobility.

In one embodiment, the second measurement time is time indicated by the onDuration timer configured by a system and active time.

In one embodiment, reporting the CSI measurement result to the base station includes:

reporting the CSI measurement result to the base station according to a second DCI if the second DCI for scheduling CSI reporting resources is received.

It should be noted that the terminal provided by this embodiment can achieve all the methodological steps that the method embodiments can achieve, and achieve the same beneficial effect. Thus, the same contents and beneficial effects of the terminal embodiments as those of the method embodiments are not repeated here.

In addition, the logic instructions in the memory 530 may be realized in the form of software functional units and may be stored in a computer readable storage medium when being sold or used as independent products. Based on such understandings, the embodiments of the present disclosure or the part that contributes can be embodied in the form of a software product. The computer software product is stored in a storage medium, including a number of instructions to enable a computer device (such as personal computers, servers, or network equipment, etc.) to perform all or a part of the steps of the methods described in each embodiment of the present application. The storage media above include U disk, mobile hard disk, read-only memory (ROM), random access memory (RAM), disk or optical disk and other media that may store program codes.

Figure 6:
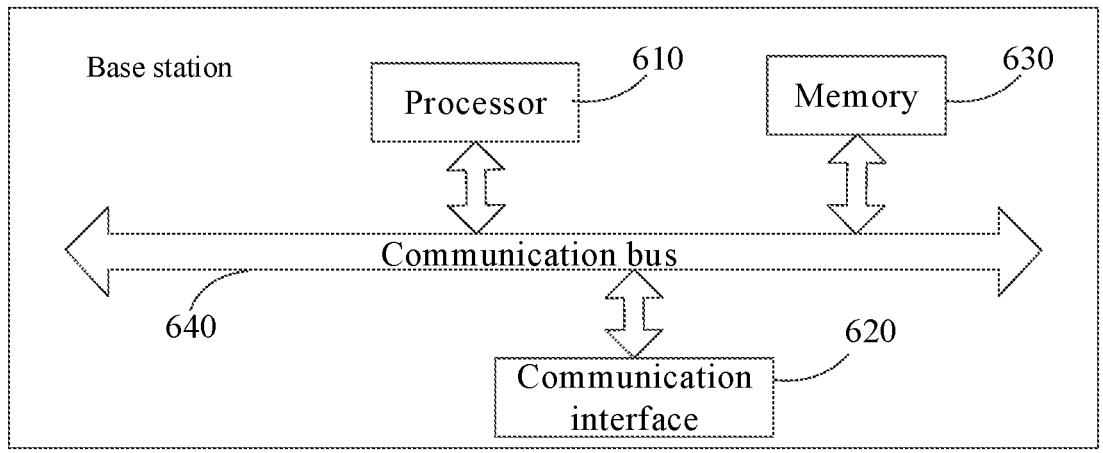
FIG. 6 is a structural diagram of a base station according to an embodiment of the present application.

Furthermore, refer to FIG. 6, FIG. 6 is an entity structural diagram of a base station according to an embodiment of the present application. The base station may include a processor 610, a communication interface 620, a memory 630 and a communication bus 640. The processor 610, the communication interface 620 and the memory 630 communicate with each other through the communication bus 640. The processor 610 may call computer program stored in the memory 630 and run on the processor 610 to perform the following steps:

transmitting first indication information configured for the terminal for reporting channel state information (CSI) in a power saving state;

generating first downlink control information (DCI) scrambled by power saving radio network temporary identity (PS-RNTI) and transmitting the first DCI to the terminal and the terminal performs CSI measurement according to the first indication information and/or the first DCI; and receiving a CSI measurement result reported by the terminal and performing a corresponding scheduling according to the CSI measurement result.

In one embodiment, types of the CSI includes at least one type of periodic CSI, semi-persistent CSI, aperiodic CSI or measurements based on CSI-RS-resource-mobility.

In one embodiment, the CSI measurement result is determined by the terminal by performing CSI measuring and/or reporting according to a standard-predefined and/or high-layer preconfigured third indication information used for reporting the CSI; and/or by performing CSI measuring and/or reporting according to a second indication information included in the first DCI.

In one embodiment, the second indication information is used for indicating whether a user reports the CSI in a subsequent discontinuous reception (DRX) period; and the second indication information is used for indicating a status of the aperiodic CSI, reporting-source information, reporting-identification numbers of the periodic CSI, reporting-identification numbers of the semi-persistent CSI, information of a secondary cell (Scell) or a Scell group reported by the CSI;

the reporting-identification numbers of the periodic CSI includes one or more identification numbers of all the periodic CSI or the semi-persistent CSI or all identification numbers of the periodic CSI or the semi-persistent CSI.

In one embodiment, the second indication information at least includes a joint code including at least two of CSI reporting indication including CSI status indication to be reported;

resource indication; and waking up or sleeping indication.

In one embodiment, the CSI measuring and/or reporting is performed by the terminal when the first DCI indicates that a user wakes up.

In one embodiment, the third indication information includes:

a standard-predefined and/or high-layer preconfigured CSI measurement period and/or a CSI reporting period;

a determination of whether to report the CSI;

reporting-resource information; and the reporting-identification numbers of the periodic CSI or the reporting-identification numbers of the semi-persistent CSI, the information of a secondary cell (Scell) or a Scell group reported by the CSI; in which:

the reporting-identification numbers of the periodic CSI includes one or more identification numbers of all the periodic CSI or the semi-persistent CSI or all identification numbers of the periodic CSI or the semi-persistent CSI.

In one embodiment, the standard-predefined and/or high-layer preconfigured CSI measurement period and/or the reporting period satisfies at least one of the following conditions:

a specified period prior to a configured DRX timer (onDuration timer) starts, during which the CSI is measured and reported;

a period subsequent to a first power saving physical downlink control channel (PS PDCCH) detecting occasion;

the most recent CSI measurement occasion occurs in a period for CSI to be reported; and/or the terminal reports the CSI only in case of receiving at least one CSI-RS transmission occasion for channel measurement and CSI-RS and/or CSI-IM transmission occasion for interference measurement in a period for CSI to be reported; and when the terminal is configured with the DRX, the terminal is not required to perform measurement of CSI-RS resources other than during a second measurement time for measurements based on CSI-RS-resource-mobility.

In one embodiment, the second measurement time is time indicated by the onDuration timer configured by a system and active time.

In one embodiment, the method further includes generating a second DCI for scheduling CSI reporting resources, and transmitting the second DCI to the terminal and the terminal reports the CSI measurement result to the base station according to the second DCI.

It should be noted that the based station provided by this embodiment can achieve all the methodological steps that the method embodiments can achieve, and achieve the same beneficial effect. Thus, the same contents and beneficial effects of the based station embodiments as those of the method embodiments are not repeated here.

In addition, the logic instructions in the memory 630 may be realized in the form of software functional units and may be stored in a computer readable storage medium when being sold or used as independent products. Based on such understandings, the embodiments of the present disclosure or the part that contributes to the prior art or the part of the technical solution can be embodied in the form of a software product in essence. The computer software product is stored in a storage medium, including a number of instructions to enable a computer device (such as personal computers, servers, or network equipment, etc.) to perform all or a part of the steps of the methods described in each embodiment of the present application. The storage media above include U disk, mobile hard disk, read-only memory (ROM), random access memory (RAM), disk or optical disk and other media that may store program code.

An embodiment of the present application also provides a non-transient computer readable storage medium storing computer program, the computer programs, when executed by a processor, cause the processor to implement the following steps method for reporting information:

receiving first indication information configured for a terminal by a base station for reporting channel state information (CSI) in a power saving state;

receiving first downlink control information (DCI) scrambled by power saving radio network temporary identity (PS-RNTI), transmitted by the base station; and performing a CSI measurement according to the first indication information and/or the first DCI and reporting a CSI measurement result to the base station.

An embodiment of the present application also provides a non-transient computer readable storage medium storing computer program, the computer programs, when executed by a processor, cause the processor to implement the following steps of method for reporting information:

transmitting first indication information configured for a terminal for reporting channel state information (CSI) in a power saving state;

generating first downlink control information (DCI) scrambled by power saving radio network temporary identity (PS-RNTI), and transmitting the first DCI to the terminal and the terminal performs CSI measurement according to the first indication information and/or the first DCI; and receiving a CSI measurement result reported by the terminal and performing a corresponding scheduling according to the CSI measurement result.

It should be noted that the non-transient computer readable storage medium provided by this embodiment can achieve all the methodological steps that the method embodiments can achieve, and achieve the same beneficial effects. Thus, the same contents and beneficial effects of the non-transient computer readable storage medium embodiments as those of the method embodiments are not repeated here.

The device embodiments described above is only schematic, in which the unit described as a separation component may be or may not be physically separated, and the component displayed as a unit may be or may not be a physical unit. That is, it may be located in a position or may be distributed to multiple network units. Some or all of the devices may be selected according to the actual needs to achieve the purpose of the scheme of the embodiments.

Through the description of the above embodiment methods, technicians in this field may clearly understand that each embodiment may be realized by software and the necessary general hardware platform, and of course, it can also be realized by hardware. Based on such understandings, the technical solution in essence or the part that contributes to the prior art can be embodied in the form of a software product. The computer software product is stored in a computer readable storage medium, such as ROM/RAM, disk, optical disk, etc., including a number of instructions to enable a computer device (e.g., personal computer, server, or network equipment) to perform the methods described in each embodiment or some parts of the embodiment.

What is claimed is:

1. A method for reporting information, comprising:

receiving first indication information configured for a terminal by a base station for reporting channel state information (CSI);

receiving first downlink control information (DCI) scrambled by power saving radio network temporary identity (PS-RNTI), transmitted by the base station; and performing a CSI measurement according to the first indication information and/or the first DCI and reporting a CSI measurement result to the base station;

wherein performing the CSI measurement according to the first indication information and/or the first DCI and reporting the CSI measurement result to the base station comprises:

measuring and/or reporting the CSI according to third indication information for reporting the CSI which is standard-predefined and/or high-layer preconfigured;

wherein the third indication information comprises:

a standard-predefined and/or high-layer preconfigured CSI measurement period and/or a CSI reporting period; and a determination of whether to report the CSI.

2. The method of claim 1, wherein types of the CSI comprise at least one type of: periodic CSI, semi-persistent CSI, aperiodic CSI or measurements based on CSI-reference signal (CSI-RS)-resource-mobility.

3. The method of claim 1, wherein performing the CSI measurement according to the first indication information and/or the first DCI and reporting the CSI measurement result to the base station comprises:

performing the CSI measurement when the first DCI indicates that a user wakes up, and reporting the CSI measurement result to the base station.

4. The method of claim 1, wherein the third indication information further comprises:

reporting-source information; and reporting-identification numbers of periodic CSI or reporting-identification numbers of semi-persistent CSI, information of a secondary cell (Scell) or a Scell group reported by the CSI;

wherein the reporting-identification numbers of the periodic CSI comprises: one or more of identification numbers of all the periodic CSI or the semi-persistent CSI, or all identification numbers of the periodic CSI or the semi-persistent CSI.

5. The method of claim 1, wherein the standard-predefined and/or high-layer preconfigured CSI measurement period and/or CSI reporting period comprises one or more of the following:

a specified period prior to a configured DRX timer (onDuration timer) starts, during which the CSI is measured and reported;

a period subsequent to a first power saving physical downlink control channel (PS PDCCH) detecting occasion;

the most recent CSI measurement occasion occurs in a period for CSI to be reported;

and/or the terminal reports the CSI only in case of receiving at least one CSI-RS transmission occasion for channel measurement and CSI-RS and/or CSI-IM transmission occasion for interference measurement in a period for CSI to be reported; or when the terminal is configured with the DRX, the terminal is not required to perform measurement of CSI-RS resources other than during a second measurement time for measurements based on CSI-RS-resource-mobility.

6. The method of claim 5, wherein the second measurement time is time indicated by the onDuration timer configured by a system and active time.

7. The method of claim 1, wherein reporting the CSI measurement result to the base station comprises:

reporting the CSI measurement result to the base station according to a second DCI when the second DCI for scheduling CSI reporting resources is received.

8. A method for reporting information, comprising:

transmitting first indication information configured for a terminal for reporting channel state information (CSI);

generating first downlink control information (DCI) scrambled by power saving radio network temporary identity (PS-RNTI) and transmitting the first DCI to the terminal, wherein the first DCI is configured to indicate the terminal to perform CSI measurement according to the first indication information and/or the first DCI; and receiving a CSI measurement result reported by the terminal and performing a corresponding scheduling according to the CSI measurement result;

wherein the CSI measurement result is determined by the terminal by performing CSI measuring and/or reporting according to a standard-predefined and/or high-layer preconfigured third indication information used for reporting CSI;

wherein the third indication information comprises:

a standard-predefined and/or high-layer preconfigured CSI measurement period and/or a CSI reporting period; and a determination of whether to report the CSI.

9. The method of claim 8, wherein types of the CSI comprise at least one type of: periodic CSI, semi-persistent CSI, aperiodic CSI or measurements based on CSI-RS-resource-mobility.

10. The method of claim 8, wherein the CSI measuring and/or reporting is performed by the terminal when the first DCI indicates that a user wakes up.

11. The method of claim 8, wherein the third indication information further comprises:

reporting-resource information; and reporting-identification numbers of periodic CSI or reporting-identification numbers of semi-persistent CSI, information of a secondary cell (Scell) or a Scell group reported by the CSI;

wherein the reporting-identification numbers of the periodic CSI comprises one or more of identification numbers of all the periodic CSI or the semi-persistent CSI or all identification numbers of the periodic CSI or the semi-persistent CSI.

12. The method of claim 8, wherein the standard-predefined and/or high-layer preconfigured CSI measurement period and/or the CSI reporting period comprises one or more of the following:

a specified period prior to a configured DRX timer (onDuration timer) starts, during which the CSI is measured and reported;

a period subsequent to a first power saving physical downlink control channel (PS PDCCH) detecting occasion;

the most recent CSI measurement occasion occurs in a period for CSI to be reported; and/or the terminal reports the CSI only in case of receiving at least one CSI-RS transmission occasion for channel measurement and CSI-RS, and/or CSI-IM transmission occasion for interference measurement in a period for CSI to be reported; or when the terminal is configured with the DRX, the terminal is not required to perform measurement of CSI-RS resources other than during a second measurement time for measurements based on CSI-RS-resource-mobility.

13. The method of claim 12, wherein the second measurement time is time indicated by the onDuration timer configured by a system and active time.

14. The method of claim 8, further comprising:

generating a second DCI for scheduling CSI reporting resources, and transmitting the second DCI to the terminal, wherein the second DCI is configured to indicate the terminal to report the CSI measurement result to a base station according to the second DCI.

15. A base station, comprising a memory, a processor and a program stored in the memory and executable by the processor, wherein the processor performs steps of claim 8.

16. A terminal, comprising a memory, a processor and a program stored in the memory and executable by the processor, wherein the processor performs following steps in case of executing the program:

receiving first indication information configured for a terminal by a base station for reporting channel state information (CSI);

receiving first downlink control information (DCI) scrambled by power saving radio network temporary identity (PS-RNTI), transmitted by the base station; and performing a CSI measurement according to the first indication information and/or the first DCI and reporting a CSI measurement result to the base station;

wherein performing the CSI measurement according to the first indication information and/or the first DCI and reporting the CSI measurement result to the base station comprises:

measuring and/or reporting the CSI according to third indication information for reporting the CSI which is standard-predefined and/or high-layer preconfigured;

wherein the third indication information comprises:

a standard-predefined and/or high-layer preconfigured CSI measurement period and/or a CSI reporting period; and a determination of whether to report the CSI.

* * * * *